United States Patent
Kim et al.

(10) Patent No.: US 7,940,424 B2
(45) Date of Patent: May 10, 2011

(54) IMAGE FORMING DEVICE AND METHOD WHICH OUTPUTS MONO OBJECT WHEN OBJECT NOT ACTUALLY EXPRESSED IN COLORS OR NOT ACTUALLY TO BE PRINTED

(75) Inventors: So-hye Kim, Suwon-si (KR); Man-chan Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 680 days.

(21) Appl. No.: 12/039,928

(22) Filed: Feb. 29, 2008

(65) Prior Publication Data

US 2009/0051945 A1 Feb. 26, 2009

(30) Foreign Application Priority Data

Aug. 20, 2007 (KR) ........................ 10-2007-0083170

(51) Int. Cl.
*H04N 1/23* (2006.01)
*H04N 1/40* (2006.01)
*H04N 1/50* (2006.01)
*H04N 1/56* (2006.01)

(52) U.S. Cl. ........ 358/1.9; 358/2.1; 358/3.24; 358/1.13; 358/530

(58) Field of Classification Search .................... 358/1.9, 358/2.1, 3.01, 3.24, 3.26, 3.27, 1.13, 1.18, 358/501, 529, 530, 538, 401, 448, 453, 462, 358/463, 468, 296
See application file for complete search history.

(56) References Cited

U.S. PATENT DOCUMENTS

| | | | | |
|---|---|---|---|---|
| 5,659,407 | A * | 8/1997 | Andresen et al. | 358/530 |
| 7,145,693 | B2 * | 12/2006 | Kagawa | 358/1.9 |
| 7,365,865 | B2 * | 4/2008 | Kidani et al. | 358/1.13 |
| 7,676,171 | B2 * | 3/2010 | Swantner et al. | 358/1.13 |
| 2006/0244988 | A1 * | 11/2006 | Oishi | 358/1.13 |
| 2007/0024920 | A1 * | 2/2007 | Kishi et al. | 358/448 |
| 2007/0097404 | A1 * | 5/2007 | Ataka | 358/1.13 |
| 2008/0062483 | A1 * | 3/2008 | Morimoto | 358/530 |
| 2008/0186526 | A1 * | 8/2008 | Kidani et al. | 358/1.13 |

FOREIGN PATENT DOCUMENTS

| | | |
|---|---|---|
| JP | 2006-159546 | 6/2006 |
| JP | 2006-309427 | 11/2006 |

* cited by examiner

*Primary Examiner* — Scott A Rogers
(74) *Attorney, Agent, or Firm* — Staas & Halsey LLP

(57) ABSTRACT

An image forming method which examines validity of an output object using an ROP, for example, and determines whether the output object is printed in a color mode or in a mono mode, is provided. The method includes detecting an output object having a color value from among output objects constituting a mono page, examining the validity of the detected output object, and outputting the detected output object as a mono object if the output object is determined not to be valid. Accordingly, if a mono image having an RGB value is recognized as a color object but is data not to be output on paper or media, the image is recognized as data which are not necessary to be output using color toner, so that only black toner is used. Accordingly, the printing rate increases, and efficiency of processing a printing is enhanced.

20 Claims, 8 Drawing Sheets

FIG. 2

| DE | HE | OC | Char |
|---|---|---|---|
| 0 | 00 | 000 | Ctrl-@ |
| 1 | 01 | 001 | Ctrl-A SOH |
| 2 | 02 | 002 | Ctrl-B STX |
| 3 | 03 | 003 | Ctrl-C ETX |
| 4 | 04 | 004 | Ctrl-D EOT |
| 5 | 05 | 005 | Ctrl-E ENQ |
| 6 | 06 | 006 | Ctrl-F ACK |
| 7 | 07 | 007 | Ctrl-G BEL |
| 22 | 16 | 026 | Ctrl-V STN |
| 23 | 17 | 027 | Ctrl-W ETB |
| 24 | 18 | 030 | Ctrl-X CAN |
| 25 | 19 | 031 | Ctrl-Y EM |
| 26 | 1A | 032 | Ctrl-Z SUB |
| 27 | 1B | 033 | Ctrl-[ ESC |
| 28 | 1C | 034 | Ctrl-W FS |
| 29 | 1D | 035 | Ctrl-] GS |
| 30 | 1E | 036 | Ctrl-^ RS |
| 31 | 1F | 037 | Ctrl_ US |
| 32 | 20 | 040 | Space |
| 33 | 21 | 041 | ! |
| 34 | 22 | 042 | " |
| 35 | 23 | 043 | # |
| 36 | 24 | 044 | $ |
| 37 | 25 | 045 | % |
| 38 | 26 | 046 | & |
| 39 | 27 | 047 | ' |
| 40 | 28 | 050 | ( |
| 41 | 29 | 051 | ) |
| 42 | 2A | 052 | * |

FIG. 3A

```
ubyte_array [ 255 0 0 ]
RGBColor
// Operator Position: 11410
SetBrushSource uint16_array [ 3 ] TextData
// Operator Position: 11412
Text
```

FIG. 3B

```
ubyte_array [ 255 0 0 ]
RGBColor
// Operator Position: 83
SetBrushSource
uint16_array [ 32 ] TextData
// Operator Position: 85
Text
```

IMAGE FORMING DEVICE AND METHOD WHICH OUTPUTS MONO OBJECT WHEN OBJECT NOT ACTUALLY EXPRESSED IN COLORS OR NOT ACTUALLY TO BE PRINTED

CROSS-REFERENCE TO RELATED APPLICATION

This application claims all benefits accruing under 35 U.S.C. §119 from Korean Patent Application No. 2007-83170, filed on Aug. 20, 2007, in the Korean Intellectual Property Office, the entire disclosure of which is incorporated herein by reference.

BACKGROUND OF THE INVENTION

1. Field of the Invention

Example embodiments of the present invention relate to an image forming device and a method thereof, and more particularly, to an image forming device which examines validity of an output object, and determines whether the output object is one that is to be actually printed in a color mode or in a mono mode, and a method thereof.

2. Description of the Related Art

Image forming devices, such as photocopiers, printers, facsimile machines, or multifunction peripherals (MFP) (which offer functions of the preceding devices in a single device) commonly have a printing function. Among such devices, printers are the most widespread for printing data received from a computer or a scanner onto paper or media.

As electronic technology developed, color printers which can print data in color as well as mono (i.e., monochrome, black and white, or gray tone) have also become widespread. The image forming devices capable of color printing, such as a color printer, have a plurality of developing units and toners for cyan (C), magenta (M), yellow (Y), and black (K) (i.e., CMYK) colors. Thus, printing is performed a total of four times in order for each of the four colors to be printed. Accordingly, the printing time thereof is greater than in the case of mono printing, in which printing is performed only once using the black color.

When data to be printed include a mono image, that is, not a color image, the image forming device may still print the data to be printed in a color mode. For example, even though a part of the data would be expressed as an empty space on a print paper or a medium, the image forming device may well recognize the part of the data as color data, and thus, operate in the color mode. This is because red (R), green (G), and blue (B) (i.e., RGB) values are still allocated to the mono image, so the mono image is erroneously recognized as a color image.

In a typical image forming device, RGB values of a pen or a brush are examined, and an image is determined not to be a mono image if the RGB values thereof are for color. However, if an output object to be expressed using a brush or pen is not meaningful data that is to be actually printed, or if there is no output object, errors in a mono image detection occur. Accordingly, the image forming device is operated in the color mode in which printing for CMYK colors is still performed. Therefore, printing time increases.

In addition, in another typical image forming device, data in an entire rendered page are examined, so that if the data are printed using the CMYK colors, the data are determined not to be mono data. However, since a determination as to whether the data are mono data is made using completely rendered data to increase precision, the performance rate or print speed decreases compared to that of a typical method of examining a color value of the brush or the pen.

SUMMARY OF THE INVENTION

Example embodiments of the present invention relate to an image forming device which outputs an output object as a mono object if the output object is one which is not actually expressed on a print paper or a medium in RGB colors, or if there is no object to draw using a brush or a pen, so as to reduce printing time, and a method thereof.

Another aspect of the present invention relates to an image forming device which examines a validity of an object using a Raster Operation (ROP) calculation, and outputs the object as a mono object if the object is an object which does not have a destination value, that is, is not actually output on print paper or medium, and a method thereof.

Additional aspects and/or advantages of the invention will be set forth in part in the description which follows and, in part, will be obvious from the description, or may be learned by practice of the invention.

According to an example embodiment of the present invention, there is provided a method of forming an image including detecting an output object having a color value from among output objects constituting a mono page, examining a validity of the detected output object, and outputting the detected output object as a mono object if the output object is determined not to be valid.

According to an example embodiment of the present invention, wherein the detected output object is determined to be valid if the detected output object is an object to be actually output on a medium.

According to an example embodiment of the present invention, the method further includes outputting the detected output object as a color object if the output object is determined to be valid.

According to an example embodiment of the present invention, wherein the output object is detected by comparing chrominance component values of each output object constituting the mono page.

According to an example embodiment of the present invention, the validity of the detected output object is examined by determining whether a DESTINATION is included in an operand of a Raster Operation (ROP) calculation using a setting value of the ROP calculation in print data.

According to an example embodiment of the present invention, the validity of the detected output object is further examined by determining that the detected output object is valid if the DESTINATION is included in the ROP calculation, and determining that the detected output object is not valid if the DESTINATION is not included in the ROP calculation.

According to another aspect of the present invention, an image forming device includes an object detection unit which detects an output object having a color value from among output objects constituting a mono page, and a print control unit which examines a validity of the detected output object, and outputs the detected output object as a mono object or a color object according to the examination result of the validity.

According to an example embodiment of the present invention, the print control unit determines that the detected output object is valid if the detected output object is an object to be actually output on a medium.

According to an example embodiment of the present invention, the print control unit outputs the detected output object that is valid as a color object, and outputs the detected output object that is not valid as a mono object.

According to an example embodiment of the present invention, the object detection unit compares chrominance component values of each output object constituting the mono page.

According to an example embodiment of the present invention, the print control unit determines whether a DESTINATION is included in an operand of a Raster Operation (ROP) calculation using a setting value of the ROP calculation in print data.

According to an example embodiment of the present invention, the print control unit determines that the detected output object is valid if the DESTINATION is included in the ROP calculation, and determines that the detected output object is not valid if the DESTINATION is not included in the ROP calculation.

According to an example embodiment of the present invention, a method of forming an image of a page in a color mode or a mono mode of an image forming apparatus, includes: determining whether an output object from among output objects constituting the page has a color value; selectively determining whether the output object is to be actually printed on a medium; and selectively forming the image of the page in the mono mode if the output object is determined not to have a color value or if the output object is determined not to be actually printed on the medium.

According to an example embodiment of the present invention, an image forming apparatus to form an image of a page in a color mode or a mono mode, includes: an object detector to determine whether an output object from among output objects constituting the page has a color value; and a print controller to selectively determine whether the output object is to be actually printed on a medium, and to control selective forming of the image of the page in the mono mode if the output object is determined not to have a color value or if the output object is determined not to be actually printed on the medium.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 2 shows an American Standard Code for Information Interchange (ASCII) table used to examine validity in an image forming device according to an example embodiment of the present invention;

FIGS. 3A and 3B show examples of printer commands which can be applied to an image forming device according to an example embodiment of the present invention;

DETAILED DESCRIPTION OF THE EMBODIMENTS

Figure 1:
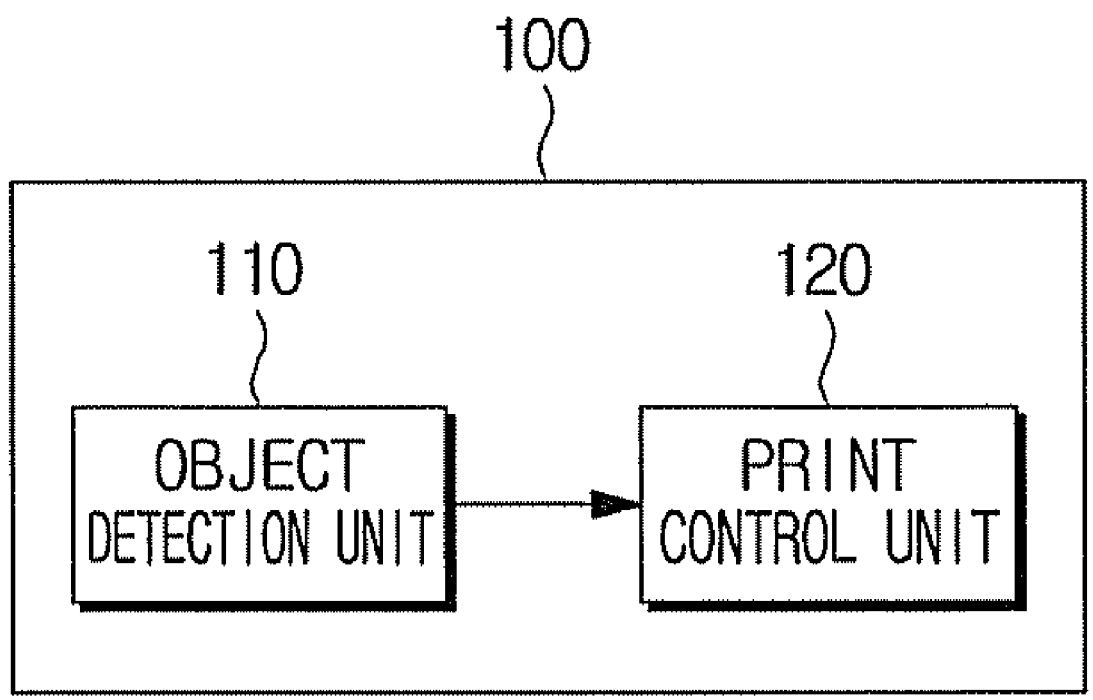
FIG. 1 is a block diagram of an image forming device according to an example embodiment of the present invention.

Reference will now be made in detail to embodiments of the present invention, examples of which are illustrated in the accompanying drawings, wherein like reference numerals refer to the like elements throughout. The example embodiments are described below in order to explain the present invention by referring to the figures.

FIG. 1 is a block diagram of an image forming device 100 according to an example embodiment of the present invention. The image forming device 100 includes an object detection unit 110, and a print control unit 120. The object detection unit 110 detects output objects having a color value from among output objects composing a mono page. The output object refers to an object to be printed, which can be expressed in diverse forms, including a text, a letter, a line, a surface, and/or an image.

The object detection unit 110 compares chrominance component values of each output object that together compose the mono page, and if the chrominance component values of each output object are different, determines the output objects as ones having color values. In more detail, RGB values of each output object are compared, and if the RGB values have the same value, each output object is determined to be a mono object. On the other hand, if at least one RGB value has a different value, the output object is determined to be a color object.

The print control unit 120 determines a validity of the detected output object, and outputs the detected output object as a mono object or a color object according to the above noted determination result. That is, the print control unit 120 determines the validity of the output object before printing is performed and before the printing result can be checked visually, so as to determine in advance whether an object is one which is not printed on paper or is one which is not drawn using a brush or a pen.

An object which is not printed on paper or is not drawn using a brush or a pen may be an object in which a user had deleted a color from a text, a point, a line, or a surface of the object, but in which a memory unit (not shown) of a computer program still remembers the color.

In greater detail, if an object is one that is to be actually printed on paper (or a medium), that is, if the object is determined to be valid, the print control unit 120 outputs the object as a color object. If an object is one that is not to be actually printed on the paper, that is, if the object is determined to be invalid, the print control unit 120 outputs the object as a mono object. If the mono object is output, the validity of a subsequent object is determined according to a subsequent command in the same manner. After a mono object or a color object is output in this manner, a print engine (not shown) prints the page in a mono or color printing manner.

The print control unit 120 also may determine the validity of the object using a Raster Operation (ROP) calculation. The ROP calculation indicates a combination operation between bits for setting the color. That is, the ROP calculation is an operation in which objects including texts, letters, points, lines, surfaces, and/or oblique lines are combined to constitute color.

The operators of the ROP calculation includes AND, OR, and XOR, and the operand of the ROP includes SOURCE, PAINT, and DESTINATION. SOURCE refers to bit map data, PAINT refers to a pen or a brush to express color information of an output object, and DESTINATION refers to a final area to draw a real image, that is, data which are actually output onto a print paper. The pen and brush are commands used in programs such as printer control language (PCL), where the pen expresses color information of edges and lines, and the brush expresses color information of an interior surface made using the pen.

In the ROP calculation, operands may include only the SOURCE and the PAINT, and may possibly not include the DESTINATION. In the latter case, an object is not expressed in terms of the DESTINATION, so although such an object is recognized as having a color (having an RGB value), the object is not actually printed on print paper. Therefore, if printing is performed in a mono mode using only the black color K, printing time can be reduced. In other words, even though objects corresponding to the SOURCE and objects corresponding to the PAINT may be expressed in RGB colors, those objects are not output to the print paper since the final DESTINATION does not have RGB colors. Accordingly, as printing does not need to be performed in a color mode for this situation, printing is performed in a mono mode.

FIG. 2 shows an American Standard Code for Information Interchange (ASCII) table used to examine validity in an image forming device according to an example embodiment of the present invention. With reference to FIG. 2, using ASCII as a manner of expressing data, decimal numeral 32 thereof indicates a space (empty space), and decimal numeral 3 thereof indicates a function key value such as Ctrl-C. Accordingly, such areas thereof are not printed onto paper.

If data represent an empty space or a function key value, nothing is printed onto a paper (or a medium). However, although nothing is printed on the paper, there may yet be an RGB color value allocated in a programming language, such as printer control language (PCL) or Postscript. Accordingly, wasteful printing operation of the image forming apparatus is performed in a color mode even though actual printable data is only for a mono mode.

Accordingly, example embodiments of the present invention can resolve the problem that occurs when a page is erroneously determined not to be a mono page simply from looking only at an RGB value of a brush or a pen that is set for an object, by excluding from the mono page those objects which are not to be actually expressed on the paper in the RGB color, or excluding those objects not to be drawn using a brush or a pen for expressing color information, by invalidating those objects.

FIGS. 3A and 3B show examples of printer commands which can be applied to an image forming device according to an example embodiment of the present invention. As described above, in the case of a printer control language (PCL) applied to example embodiments of the present invention, with reference to FIG. 3A, an RGB value (255,0,0) is allocated to a brush so that the brush has a red color value, but is indicated by decimal numeral 3 in the ASCII table of FIG. 2. Accordingly, a function key value of ctrl-c is allocated, so no images are printed on print paper in practice.

Likewise in FIG. 3B, an RGB value (255,0,0) is allocated to a brush so that the brush has a red color value, but is indicated by decimal numeral 32 with reference to the ASCII table of FIG. 2. Accordingly, a space is allocated, so no images are printed on print paper in practice.

Figure 4A:
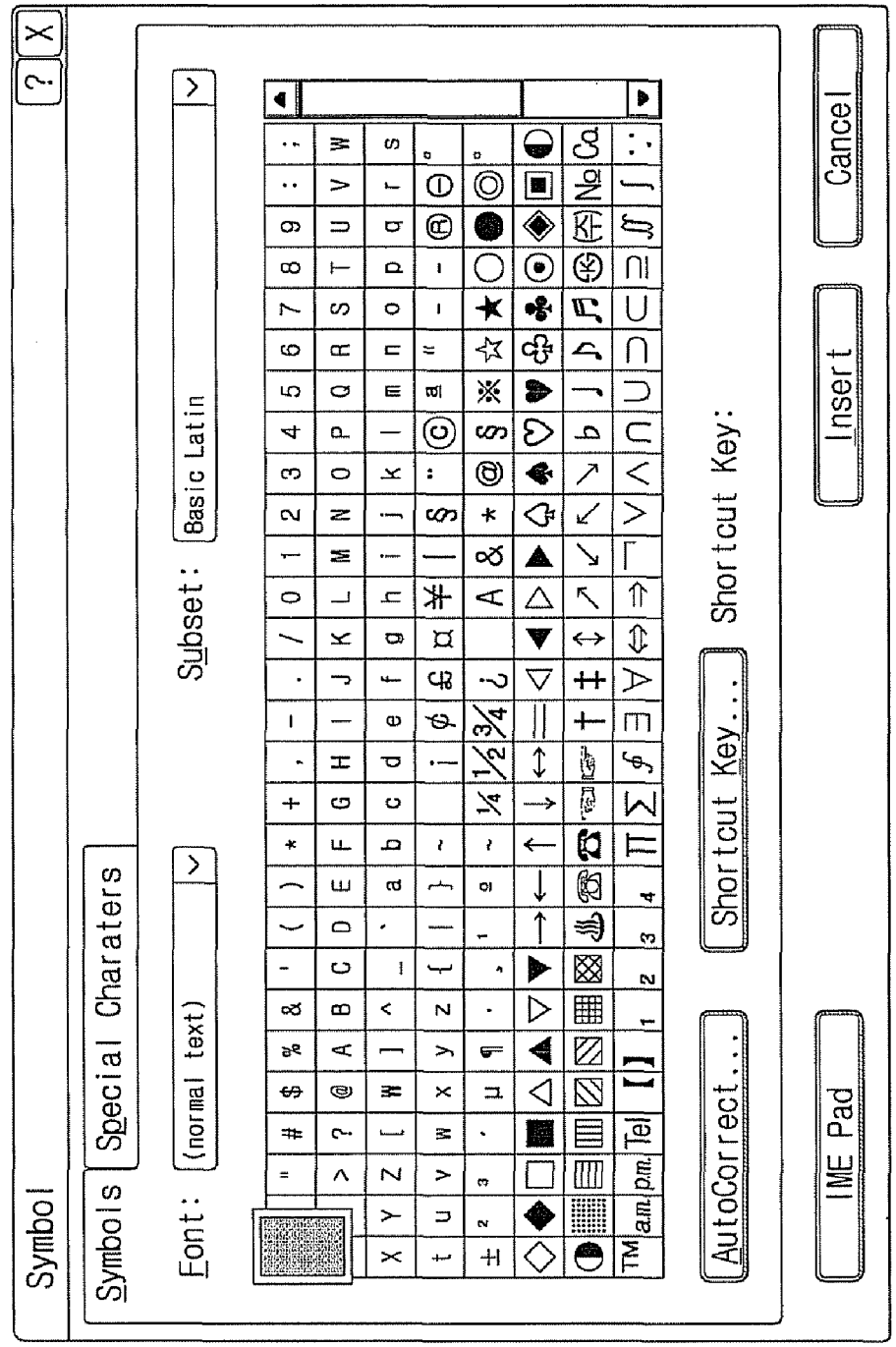
FIGS. 4A and 4B respectively show a chart of special characters in MS Word and a printer control language (PCL) to describe example embodiments of the present invention.
Figure 4B:
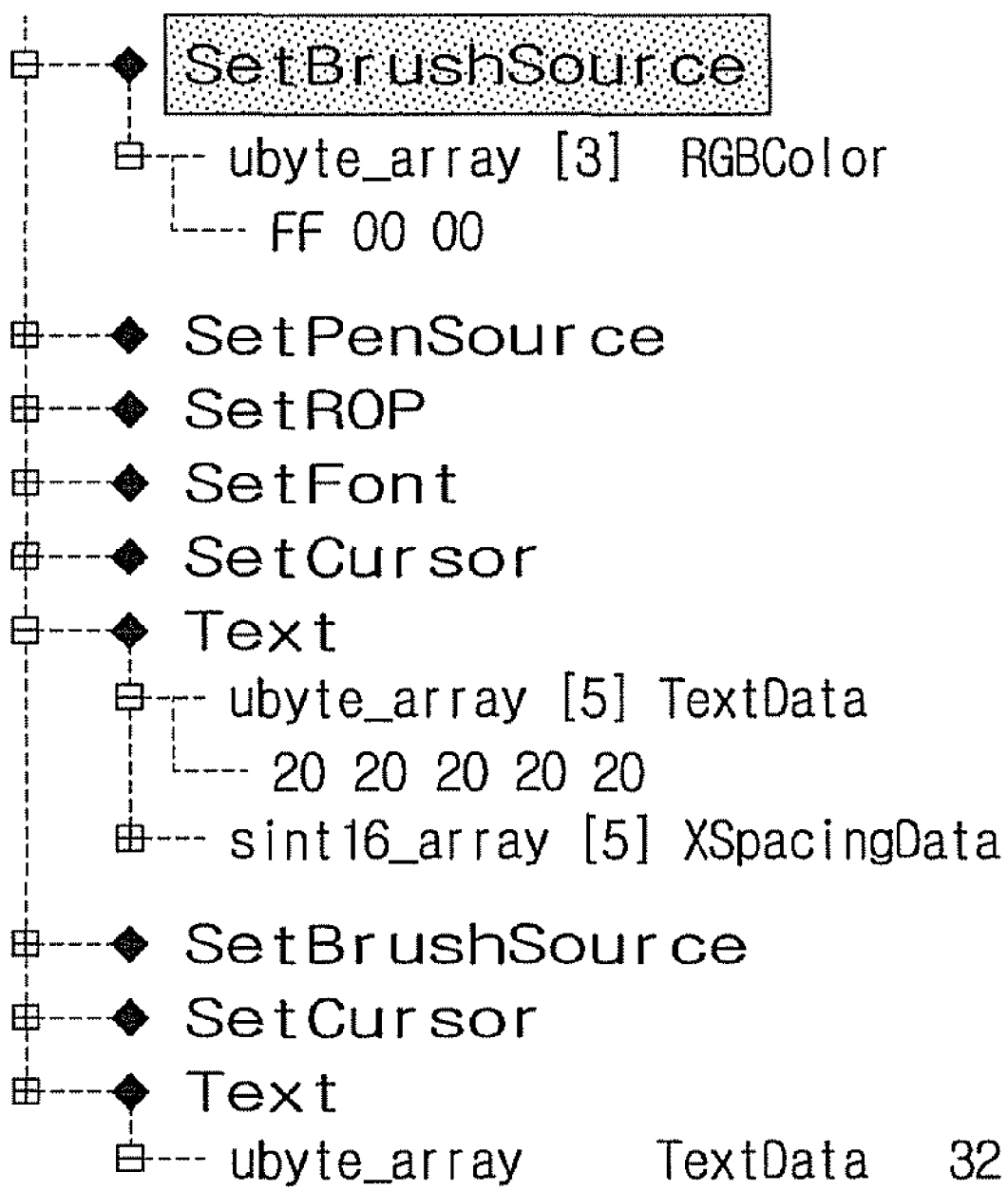

FIGS. 4A and 4B respectively show a chart of special characters in MS Word and a printer control language (PCL) to describe example embodiments of the present invention. In MS Word, as shown in FIG. 4A, an apparent blank character in a top-leftmost compartment is not a blank space in the ASCII table, but is still not actually printed on print paper. With reference to FIG. 4B, if the apparent blank character is analyzed in PCL, which is an example of a programming language of an image forming apparatus, it is seen that the brush color thereof is FF 00 00, which is set to be red. Although a red color value is set, no color would be actually printed on print paper.

Figure 5:
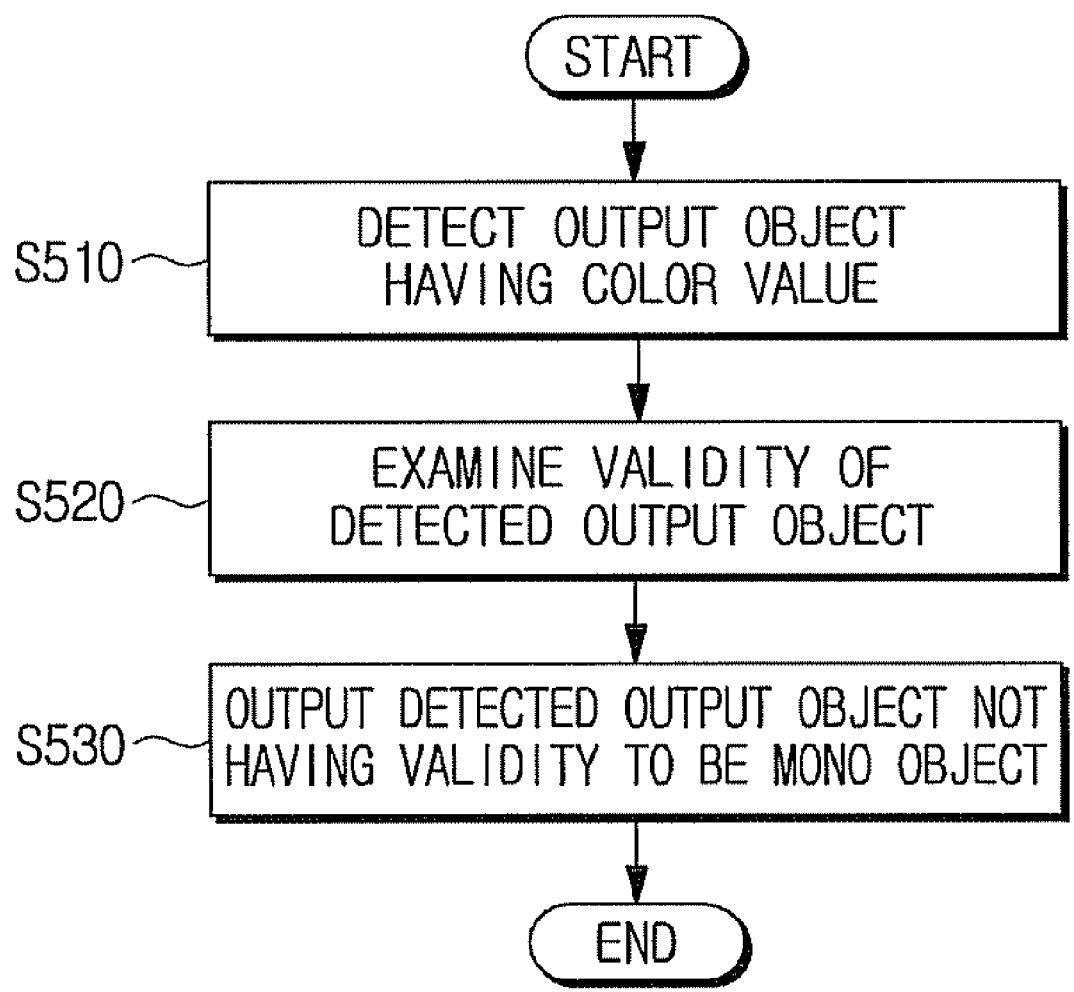
FIG. 5 is a flow chart of an image forming method according to an example embodiment of the present invention.

FIG. 5 is a flow chart of an image forming method according to an example embodiment of the present invention. First, in operation S510, an output object having a color value is detected from among output objects constituting a page (such as a mono page). More specifically, it is determined whether there is a brush or pen object to express color information in the page, and if it is determined that there is a brush or pen object to express color information, the RGB value of the brush or the pen object is determined. In addition, it is determined whether the color information of the brush or the pen object has a color value or a mono value, and the RGB values of the output objects constituting the mono page are compared. If the RGB values are different, the object is output as an output object having a color value.

In operation S520, if the color object of the page is detected, the detected color object is not printed on paper to examine its validity, but rather, it is determined whether the detected color object of the page is an object to be actually printed on print paper.

In operation S530, if the detected color object of the page is determined to be an object not to be printed on print paper, that is, it is an invalid object, the detected color object of the page is output as a mono object.

Figure 6:
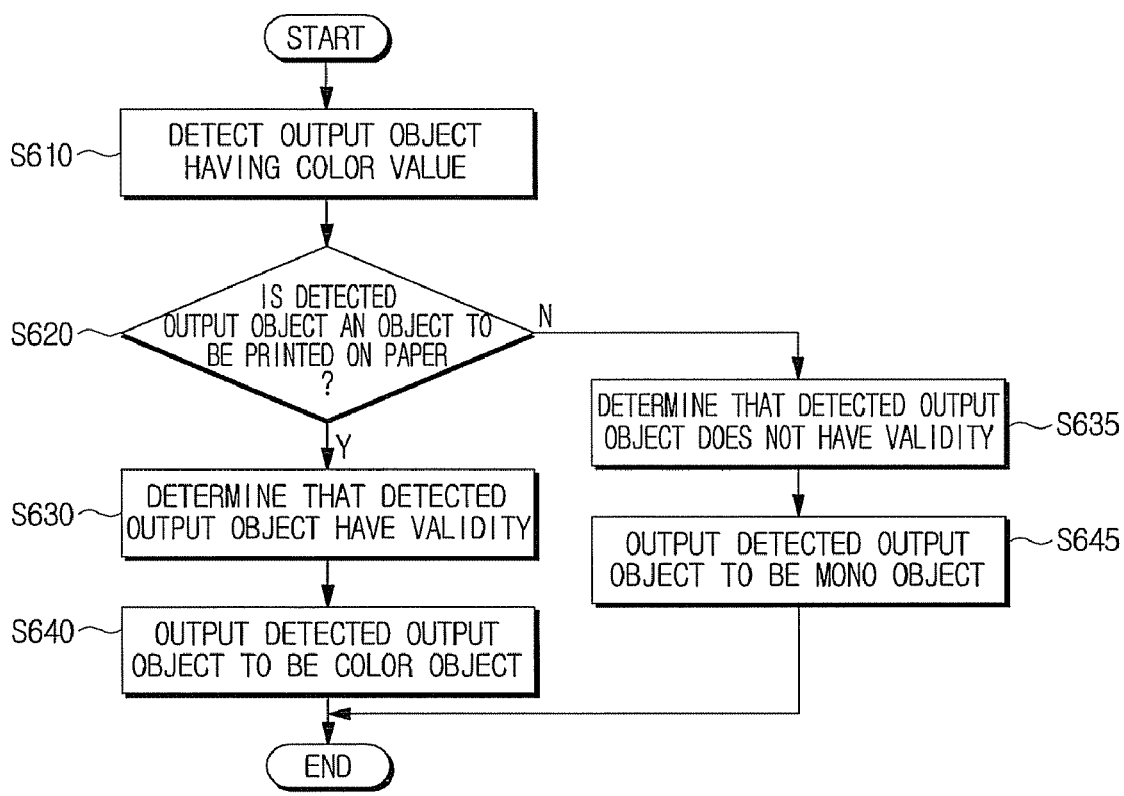
FIG. 6 is a more detailed flow chart of the image forming method of FIG. 5.

FIG. 6 is a more detailed flow chart of the image forming method of FIG. 5. In operation S610, an output object of a page having a color value is detected. In operation S620, validity of the detected output object is examined. That is, whether the detected output object is printable on print paper is examined. As a result, if the detected output object is an object to be output on print paper, the output object is determined to be valid in operation S630, and is output as a color object in operation S640. If the detected output object is determined not to be an object to be output on print paper, the output object is determined not to be valid in operation S635, and is output as a mono object in operation S645.

Figure 7:
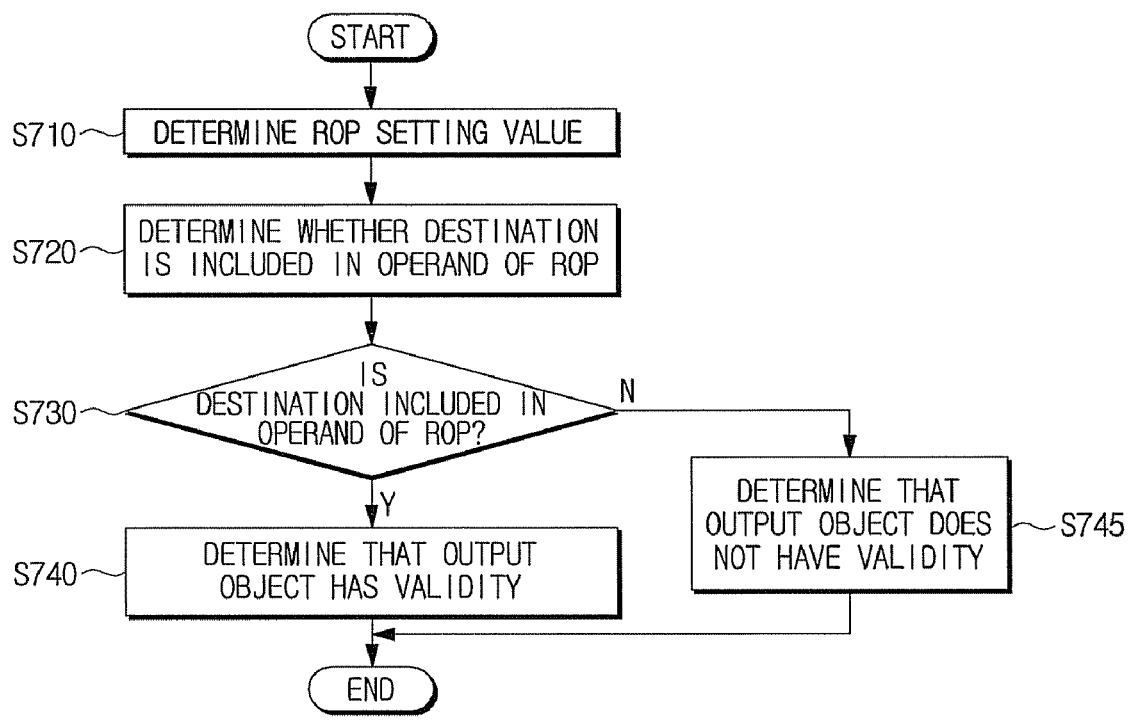
FIG. 7 is a flow chart examining validity of an object using a raster operation (ROP) calculation according to an example embodiment of the present invention.

FIG. 7 is a flow chart showing a method of examining the validity of an object of a page using a raster operation (ROP) calculation according to an example embodiment of the present invention. The validity of an object in operation S520 of FIG. 5 may be examined using the raster operation (ROP) calculation.

In operation S710, an ROP setting value is determined. In more detail, whether there is an ROP command regarding how to combine objects including points, lines, and/or surfaces is determined.

In operation S720, whether a DESTINATION is included in the operand of the ROP calculation is determined. If the DESTINATION is included in the operand of the ROP calculation in operation S730, an output object is determined to be valid in operation S740. However, if the DESTINATION is not included in the operand of the ROP calculation in operation S730, the output object is determined not to be valid in operation S745.

As described above, according to the example embodiments of the present invention, if an object, such as a mono image of a page having an RGB value, is recognized as a color object but is data not to be output on print paper or medium, the object is recognized as data which are not necessary to be output using color toner, so that only black toner is used. Accordingly, a printing rate is increased, and efficiency of processing the printing is enhanced.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, any media may be used, including paper or transparencies. Accordingly, it is intended, therefore, that the present invention not be limited to the various example embodiments disclosed, but that the present invention includes all embodiments falling within the scope of the appended claims.

What is claimed is:

1. A method of forming an image, the method comprising:
   detecting an output object having a color value from among output objects constituting a mono page;
   examining a validity of the detected output object; and
   outputting the detected output object as a mono object if the output object is determined not to be valid.

2. The method of claim 1, wherein the detected output object is determined to be valid if the detected output object is an object to be actually output on a medium.

3. The method of claim 1, further comprising outputting the detected output object as a color object if the output object is determined to be valid.

4. The method of claim 1, wherein the output object is detected by comparing chrominance component values of each output object constituting the mono page.

5. The method of claim 1, wherein the validity of the detected output object is examined by determining whether a DESTINATION is included in an operand of a Raster Operation (ROP) calculation using a setting value of the ROP calculation in print data.

6. The method of claim 5, wherein the validity of the detected output object is further examined by determining that the detected output object is valid if the DESTINATION is included in the ROP calculation, and determining that the detected output object is not valid if the DESTINATION is not included in the ROP calculation.

7. An image forming device comprising:
   an object detection unit which detects an output object having a color value from among output objects constituting a mono page; and
   a print control unit which examines a validity of the detected output object, and outputs the detected output object as a mono object or a color object according to the examination result of the validity.

8. The image forming device of claim 7, wherein the print control unit determines that the detected output object is valid if the detected output object is an object to be actually output on a medium.

9. The image forming device of claim 7, wherein the print control unit outputs the detected output object that is valid as a color object, and outputs the detected output object that is not valid as a mono object.

10. The image forming device of claim 7, wherein the object detection unit compares chrominance component values of each output object constituting the mono page.

11. The image forming device of claim 7, wherein the print control unit determines whether a DESTINATION is included in an operand of a Raster Operation (ROP) calculation using a setting value of the ROP in print data.

12. The image forming device of claim 11, wherein the print control unit determines that the detected output object is valid if the DESTINATION is included in the ROP calculation, and determines that the detected output object is not valid if the DESTINATION is not included in the ROP calculation.

13. A method of forming an image of a page in a color mode or a mono mode of an image forming apparatus, the method comprising:
   determining whether an output object from among output objects constituting the page has a color value;
   selectively determining whether the output object is to be actually printed on a medium; and
   selectively forming the image of the page in the mono mode if the output object is determined not to have a color value or if the output object is determined not to be actually printed on the medium.

14. The method of claim 13, further comprising selectively forming the image of the page in the color mode if the output object is determined to have a color value and if the output object is determined to be actually printed on the medium.

15. The method of claim 13, wherein the output object is determined to have a color value if RGB values of the output objects are different.

16. The method of claim 13, wherein the selectively forming the image of the page in the mono mode also occurs if a DESTINATION is not included in an operand of a Raster Operation (ROP) calculation of a print data.

17. An image forming apparatus to form an image of a page in a color mode or a mono mode, the apparatus comprising:
   an object detector to determine whether an output object from among output objects constituting the page has a color value; and
   a print controller to selectively determine whether the output object is to be actually printed on a medium, and to control selective forming of the image of the page in the mono mode if the output object is determined not to have a color value or if the output object is determined not to be actually printed on the medium.

18. The apparatus of claim 17, wherein the print controller further selectively forms the image of the page in the color mode if the output object is determined to have a color value and if the output object is determined to be actually printed on the medium.

19. The apparatus of claim 17, wherein object detector determines that output object has a color value if RGB values of the output objects are different.

20. The apparatus of claim 17, wherein the print controller further selectively forms the image of the page in the mono mode if a DESTINATION is not included in an operand of a Raster Operation (ROP) calculation of a print data.

* * * * *